3,437,353
MOUNTING UNIT FOR TRANSFORMING
PLANTER ROAD WHEEL TO FIELD
TRANSPORT WHEEL
Leonard F. Lange, Rte. 2, Marshalltown, Iowa 50158
Filed Feb. 10, 1967, Ser. No. 615,100
Int. Cl. B60f 5/00; B62d 21/00
U.S. Cl. 280—415                            4 Claims

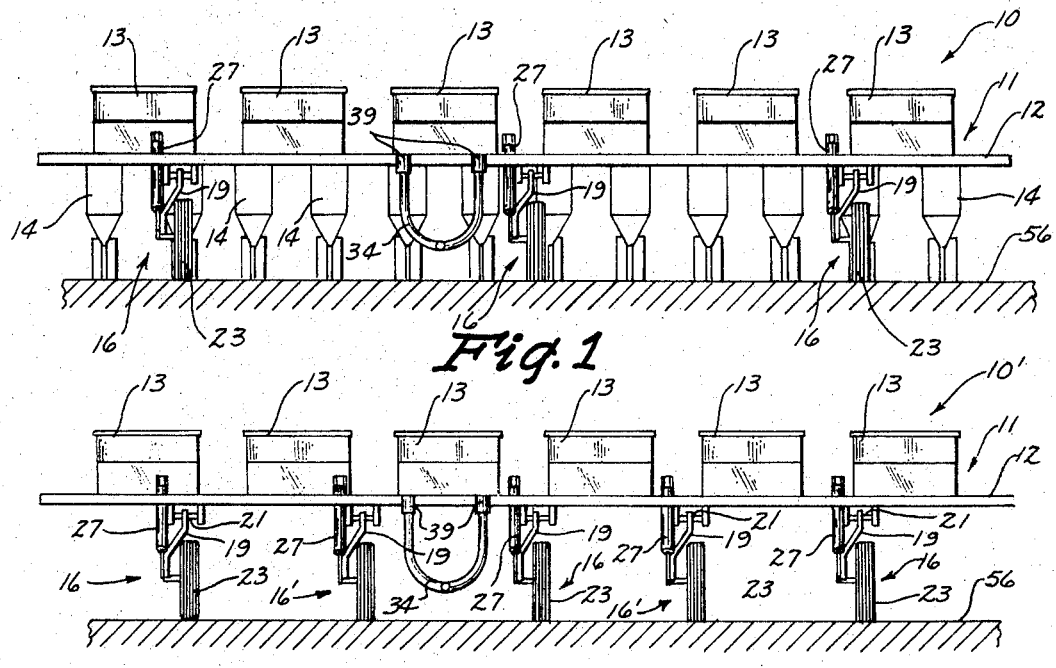
Fig. 1
Fig. 2
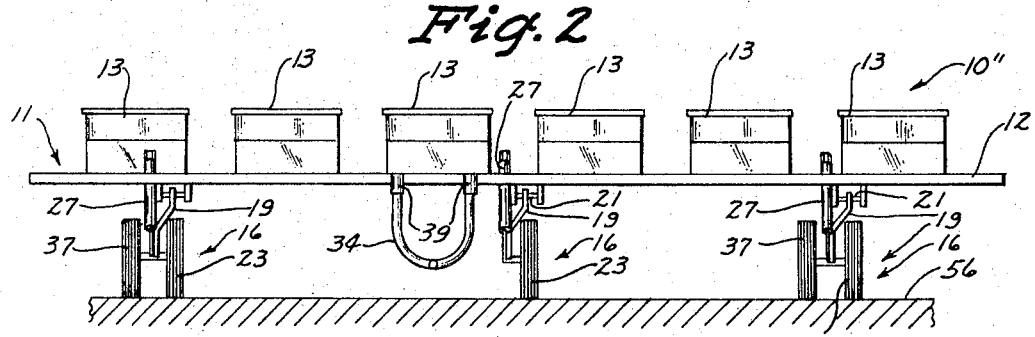
Fig. 3
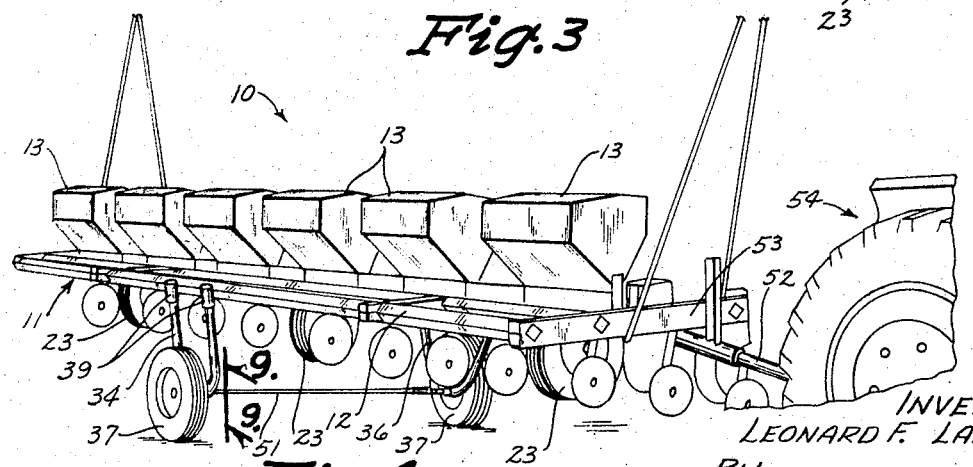
Fig. 4
INVENTOR
LEONARD F. LANGE
BY
R. Robert Henderson
ATTORNEY INVENTOR
LEONARD F. LANGE
BY
N. Robert Henderson
ATTORNEY United States Patent Office 3,437,353
Patented Apr. 8, 1969

ABSTRACT OF THE DISCLOSURE

This invention pertains to a pull-type planter unit using an endwise transport system, and is concerned primarily with using the road transport wheels as field transport wheels when the planter is actually being used in the field. More particularly, the invention relates to a mechanical improvement to a field transport wheel unit wherein a road transport wheel can be mounted in dual arrangement therewith.

Background of the invention

This invention is related to the field of farm implements, particularly pull-type planters.

With the advent of new pull-type planter designs where it became possible to mount from four to six or eight, or from six to twelve planting units on the same frame by changing their row spacings, the planter manufacturer ran into flotation problems wherein rather than having three, for example, field transport wheel units, five such units were necessary. Each unit, basically a hydraulic ram unit, comprises a wheel, support members for the frame, a rock arm for pivotal connection between the support members and the wheel axle, the ram piston and cylinder unit, and the necessary hydraulic lines.

Many conventional planters, although adding the additional two complete field transport wheel units, use a pair of road transport wheels for endwise movement of the planter over roads and through gates. When the planter is being used in the field, the road wheels are removed and laid to one side, therefore being put completely out of use.

Summary of the invention

It is an object of this invention to provide an improved pull-type planter using an endwise transport system.

It is another object of this invention to provide a new and novel use of a road transport wheel used in an endwise transport system on a pull-type planter.

It is yet another object of this invention to provide a mounting unit for placing a road transport wheel in dual relationship with a field transport wheel.

Another object of this invention is to eliminate at least two complete field transport wheel units from a modern day pull-type planter.

Still another object of this invention is the provision of an extremely simple attachment for any conventional wheel and portable frame combination wherein another wheel may be quickly and easily added to provide a dual wheel arrangement.

Brief description of the drawings

FIG. 1 is an elevational view of one model pull-type planter which uses an endwise transport system, the view seen from the front of the planter as it is being pulled in the field;

FIG. 2 is an elevational view of another model pull-type planter similar to the FIG. 1 model, certain parts eliminated for clarity of illustration;

FIG. 3 is an elevational view similar to FIGS. 1 and 2, and showing the improved planter of this invention;

FIG. 4 is a perspective view of this type planter in road transport position;

Description of the preferred embodiment

Figure 5:
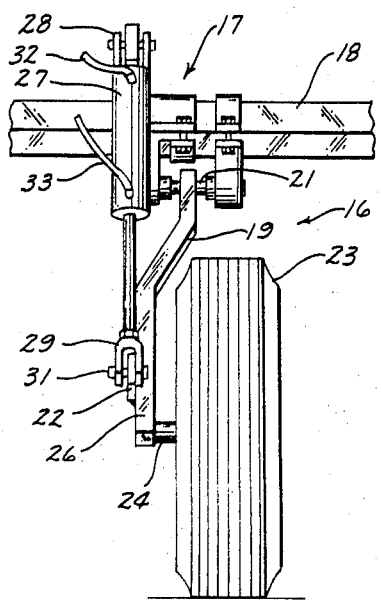
FIG. 5 is an enlarged front elevational view of one of a contemporary field transport wheel unit.

Referring particularly to FIG. 1, a pull-type planter is indicated generally at 10, the planter having a frame 11 (FIG. 4), including a tool bar 12 to which a tongue unit (not shown) is attachable, a plurality of grain hoppers 13 and planting units 14 (shown in schematic) also mounted on the frame 11, and a trio of field transport wheel units 16.

On certain types of planters, the wheel units 16 serve a dual function of providing transportation for the planter 10 not only in the field, but also on the roads and highways. Each wheel unit 16 comprises basically a releasable clamp unit 17 (see FIG. 5) for mounting on a frame piece 18 at any longitudinally spaced position thereon, an offset rocker arm 19 pivotally connected at its upper end to a rod 21 of the clamp unit 17, and the arm 19 having a lug 22 at its lower end 26.

Additionally, each wheel unit 16 includes a wheel 23 and a stub axle 24 secured, as by welding, to the lower end 26 of rocker arm 19, and a hydraulic ram device 27 pivoted to the planter frame 11 at its upper end 28. The lower, rod yoke end 29 of the ram device 27 is also pivotally connected by a pin 31 to the rocker arm lug 22, whereby hydraulic operation of the ram device, via lines 32 and 33, lifts and lowers the wheel 23.

Figure 9:
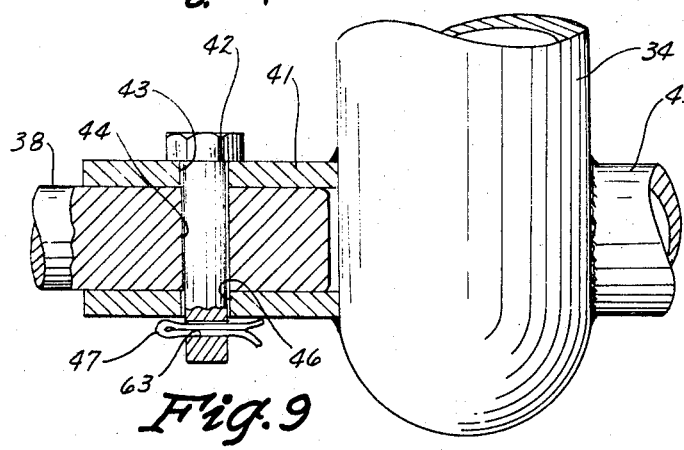
FIG. 9 is a view taken along the line 9—9 in FIG. 4, showing certain parts in section for clarity of illustration.

Referring to FIG. 1, the planter 10 is typical of an Allis-Chalmers 600 series pull-type planter unit, carrying 12-row planter units with a spacing of 20″ between each planting unit 14. The endwise transport, U-shaped wheel other support 36 shown in FIG. 4, for supporting a pair other suport 36 shown in FIG. 4, for supporting a pair of wheels 37, substantially identical to wheels 23, and also with stub axles 38 (FIG. 9).

At the base of each tubular support 34 and 36, fastened by a pair of mountings 39 to a tool bar on the front and back of the frame 11, an axle housing 41 (FIG. 9) is provided for receiving the stub axle 38, a pin 42 dropped through aligned passages 43, 44 and 46 in the housing 41 and axle 38 as illustrated, for locking same, with a cotter key 47 or the like inserted through the lower end 48 of the pin 42. Extended oppositely the housing 41 is another tubular member 49 for connection with one end of a tie-rod unit (FIG. 4) connected to tie the two road transport wheels 37 together when in use.

In this condition of the planter 10, when it is desired to use the implement in the field, the road transport wheels 37 are removed, leaving the planter 10 as illustrated in FIG. 1. The wheels 37 are placed up against a fence, or otherwise stored out of the way, but available when it is desired to move the planter 10 to another field through a gate, or on a narrow road or highway. Then, the wheels 37 are re-mounted, a tongue device 52 (FIG. 4) is connected to one end 53 of the frame 11 and is connected to a prime mover 54 for towing the planter 10 endwise.

When desired to increase the flotation of the planter 10 (FIG. 1), an additional pair of wheel units 16′ are added, one intermediate each pair of adjacent wheel units 16 as best illustrated in FIG. 2, thereby creating a new planter 10′, with all other parts remaining identical. Among reasons for the additional wheel units 16′, was the fact that due to the additional weight on the same frame 11 by the addition of extra planting units 14, the wheels 23 were sinking into the ground 56 (FIG. 1) too far.

Furthermore, the offset rocker arms 19 were twisting and wheel bearings were failing too rapidly. It should be noted also that even with the addition of the extra wheel units 16′, the road transport wheels 37 supported on the wheel supports 34 of planter 10′ were still not used during normal field use of the planter, but were laid aside.

Figure 6:
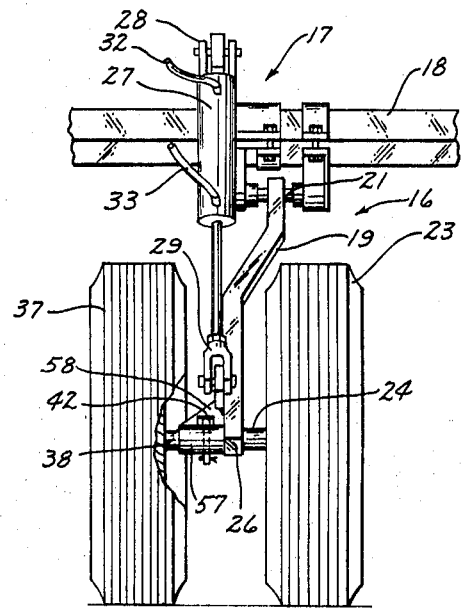
FIG. 6 is an enlarged front elevational view of the wheel unit of FIG. 5 modified by this invention.
Figure 7:
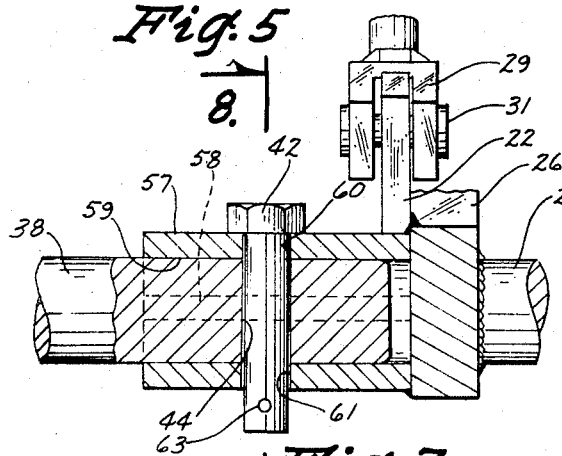
FIG. 7 is a still further enlarged view of a detail of FIG. 6, showing certain parts in section for clarity of illustration.
Figure 8:
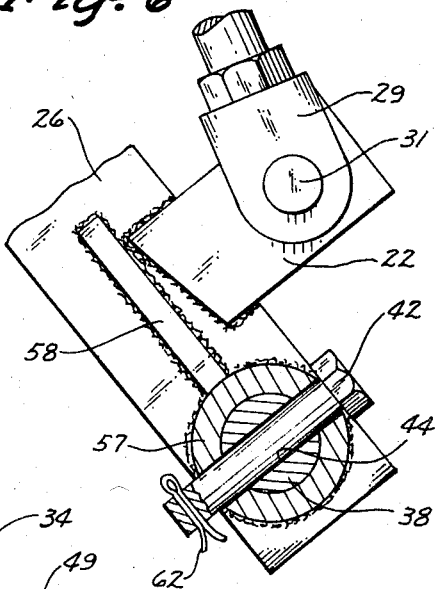
FIG. 8 is a sectional view taken along the line 8—8 in FIG. 7.

To obviate the need for the additional wheel units 16′, but still to increase flotation of the planter frame 11, the planter 10″ of FIG. 3 is provided. It is identical to the planter 10 (FIG. 1) with the following exceptions. A short piece of hollow pipe 57 (FIGS. 6 and 7) is secured, as by welding, to the lower end 26 of the outer two arms 19. The pipe 57 is placed on the side of end 26 opposite its connection on the other side with the stub axle 24, and is substantially in axial alignment with the stub axle 24. A flat, triangular gusset 58 is secured, as by welding, between the pipe 57 and the rocker arm 19, for strength to the pipe 57.

The pipe has a circular bore 59 formed therethrough the inner diameter of which is slightly greater than the outer diameter of the road transport wheel stub axle 38 (FIG. 9), and a pair of normally vertically disposed, aligned apertures 60 and 61 are formed through the pipe 57. The bore 58 will therefore receive the stub axle 38, and the pipe apertures will receive the pin 42.

Thus, after the planter 10″ has been transported over a highway and/or through a gate in the endwise position shown in FIG. 4, as a part of readying the planter 10″ for field use, each road transport wheel 37 is removed from its respective support 34. Each wheel 37 is then mounted on the pipe 57 by inserting the stub-axle 38 into the pipe 57, and locking the unit together by dropping a transport wheel pin 42 through the aligned apertures 59, 44, and 61. A cotter key 62 is inserted through a passage 63 in the lower end of the pin 42 for locking the pin 42 in place. The assembly is shown in FIG. 3.

After use in the field, the pin 42 is removed, the wheel 37 and stub axle 38 is removed from the pipe 57 and reinserted in the transport support housing 41 and the pin 42 replaced and locked to provide for continued and full use of the wheels 37. It is seen therefore, that by the provision of the pipe 57, functioning as an axle housing, on each outermost wheel unit 16, the road wheels are made use of to the economic and practical advantage of the entire planter.

Although a preferred embodiment of this invention has been disclosed and described hereinbefore, it is to be remembered that various modifications and alternate constructions may be made thereto without departing from the true spirit and scope of the invention as defined in the appended claims.

I claim:

1. In a pull-type planter having a frame, a plurality of transport field wheels each having an axle, a unit connected to the frame and to one end of each axle for raising and lowering each field wheel, an endwise transport system including a plurality of transport road wheels each having an axle and including also a pin for connecting each road wheel axle to a support connected to the frame, a mounting unit for transforming a road wheel into a field wheel comprising:

means secured to each field wheel axle for receiving a road wheel axle, and for receiving the pin therefor for locking the road wheel axle thereto.

2. A mounting unit as defined in claim 1, and wherein said means include a housing having a circular opening formed therein with an inner diameter slightly larger than the outer diameter of each road wheel axle.

3. A mounting unit as defined in claim 2, and wherein each said housing is secured to a field wheel axle on the same end thereof whereat the lift unit is connected such that the lift unit extends between a field wheel and the added road wheel.

4. A mounting unit as defined in claim 3, and wherein each said housing is in substantial axial alignment with the field wheel axle with which it is secured.

References Cited

UNITED STATES PATENTS

| | | | |
|---|---|---|---|
| 2,226,327 | 12/1940 | Smesne | 280—96.1 |
| 2,736,567 | 2/1956 | McMurray | 280—80 X |

LEO FRIAGLIA, *Primary Examiner.*

U.S. Cl. X.R.

280—34, 80.